United States Patent
Gupta et al.

(10) Patent No.: US 10,114,232 B2
(45) Date of Patent: Oct. 30, 2018

(54) FLUID-FILLED LENSES AND THEIR OPHTHALMIC APPLICATIONS

(71) Applicant: Adlens Beacon, Inc., Pembroke Park, FL (US)

(72) Inventors: Amitava Gupta, Roanoke, VA (US); William Egan, Jackson, WY (US); Lisa Nibauer, Short Hills, NJ (US); Frank Stangota, Bridgewater, NJ (US); Bruce Decker, Solebury, PA (US); Thomas M. McGuire, Princeton, NJ (US); Urban Schnell, Munchenbuchsee (CH); Karim Haroud, Chavannes sur Moudon (CH); Hans Jaeger, Thunstetten (CH); Matthew Wallace Peterson, San Francisco, CA (US); Daniel Senatore, San Francisco, CA (US)

(73) Assignee: Adlens Beacon, Inc., Pembroke Park, FL (US)

( * ) Notice: Subject to any disclaimer, the term of this patent is extended or adjusted under 35 U.S.C. 154(b) by 39 days.

(21) Appl. No.: 14/713,713

(22) Filed: May 15, 2015

(65) Prior Publication Data
US 2015/0248021 A1 Sep. 3, 2015

Related U.S. Application Data

(63) Continuation of application No. 12/855,465, filed on Aug. 12, 2010, now Pat. No. 9,036,264.

(51) Int. Cl.
*G02B 9/00* (2006.01)
*G02C 7/08* (2006.01)
(Continued)

(52) U.S. Cl.
CPC ............ *G02C 7/085* (2013.01); *G02B 3/14* (2013.01); *G02B 26/004* (2013.01)

(58) Field of Classification Search
CPC .......... G02B 3/14; G02B 3/12; G02B 3/0081; G02B 27/0025; G02B 27/017;
(Continued)

(56) References Cited

U.S. PATENT DOCUMENTS

2006/0164731 A1* 7/2006 Wu ................. G02C 7/085
359/666
2009/0116118 A1* 5/2009 Frazier ............... G02B 3/14
359/666
(Continued)

*Primary Examiner* — Alicia M Harrington
(74) *Attorney, Agent, or Firm* — Greenberg Traurig, LLP

(57) ABSTRACT

A fluid lens assembly including a front rigid lens, a semi-flexible membrane that is adapted to be expanded from a minimum inflation level to a maximum inflation level, and a fluid layer therebetween. The front lens of the fluid lens assembly is configured to have a negative optical power. In an embodiment, the fluid lens assembly may be configured to have an overall negative optical power when the membrane is expanded to the maximum inflation level. In an embodiment, the fluid lens assembly can be configured to have an overall negative optical power when the membrane is expanded between the minimum inflation level and the maximum inflation level.

19 Claims, 5 Drawing Sheets

(51) Int. Cl.
  *G02B 3/14* (2006.01)
  *G02B 26/00* (2006.01)
(58) Field of Classification Search
  CPC ........ G02B 2027/0178; G02B 27/0149; G02B 26/005; G02B 26/004; G02B 1/06; G02C 7/085; G02C 7/083; G02C 2202/16; G02C 27/085
  See application file for complete search history.

(56) References Cited

U.S. PATENT DOCUMENTS

2009/0213471 A1* 8/2009 Silver .................... G02B 3/14
                                                      359/665
2011/0085131 A1* 4/2011 Gupta .................... G02B 3/14
                                                      351/159.6

* cited by examiner

| Front curve of rigid lens | Power of rigid lens | Power of fluid lens Element | Range of adjustability |
|---|---|---|---|
| 5.00D | 3.00D | 4.69D | 4.69D to 7.69D |
| 4.00D | 2.00D | 3.69D | 3.69D to 6.69D |
| 3.00D | 1.50D | 2.77D | 2.77D to 5.77D |
| 2.00D | 1.00D | 1.85D | 1.85D to 4.85D |

FIG. 2

| Front curve of rigid lens | Power of rigid lens | Power of fluid lens element | Range of adjustability |
|---|---|---|---|
| -1.00D | -8.00D | 0.80D | -7.2D to -4.2D |
| -3.00D | -8.00D | 2.50D | -5.5D to -2.5D |
| -3.00D | -4.50D | 2.50D | -2.0D to +1.0D |

FIG. 5

FLUID-FILLED LENSES AND THEIR OPHTHALMIC APPLICATIONS

BACKGROUND

Field

Embodiments of the present invention relate to fluid-filled lenses and in particular to variable fluid-filled lenses.

Background Art

Basic fluid lenses have been known since about 1958, as described in U.S. Pat. No. 2,836,101, incorporated herein by reference in its entirety. More recent examples may be found in "Dynamically Reconfigurable Fluid Core Fluid Cladding Lens in a Microfluidic Channel" by Tang et al., Lab Chip, 2008, vol. 8, p. 395, and in WIPO publication WO2008/063442, each of which is incorporated herein by reference in its entirety. These applications of fluid lenses are directed towards photonics, digital phone and camera technology and microelectronics.

Fluid lenses have also been proposed for ophthalmic applications (see, e.g., U.S. Pat. No. 7,085,065, which is incorporated herein by reference in its entirety). In all cases, the advantages of fluid lenses including a wide dynamic range, ability to provide adaptive correction, robustness and low cost have to be balanced against limitations in aperture size, tendency to leak and consistency in performance. The '065 patent, for example, has disclosed several improvements and embodiments directed towards effective containment of the fluid in the fluid lens to be used in ophthalmic applications, although not limited to them (see, e.g., U.S. Pat. No. 6,618,208, which is incorporated by reference in its entirety). Power adjustment in fluid lenses has been effected by injecting additional fluid into a lens cavity, by electrowetting, application of ultrasonic impulse, and by utilizing swelling forces in a cross-linked polymer upon introduction of a swelling agent such as water.

BRIEF SUMMARY

In one embodiment of the present invention, a fluid lens assembly includes a front rigid lens, a semi-flexible membrane that is adapted to be expanded from a minimum inflation level to a maximum inflation level, and a fluid layer therebetween. The front lens of the fluid lens assembly of this embodiment is configured to have a negative optical power.

In certain embodiments, the fluid lens assembly is configured to have an overall negative optical power when the membrane is expanded to the maximum inflation level. In other embodiments, the fluid lens assembly is be configured to have an overall negative optical power when the membrane is expanded between the minimum inflation level and the maximum inflation level.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 2 is a table that shows optical characteristics for various lens assemblies that cover a positive power range according to an embodiment of the invention.

FIG. 5 is a table that shows optical characteristics for various lens assemblies that cover negative and negative-to-positive power ranges according to an embodiment of the invention.

Figure 1:
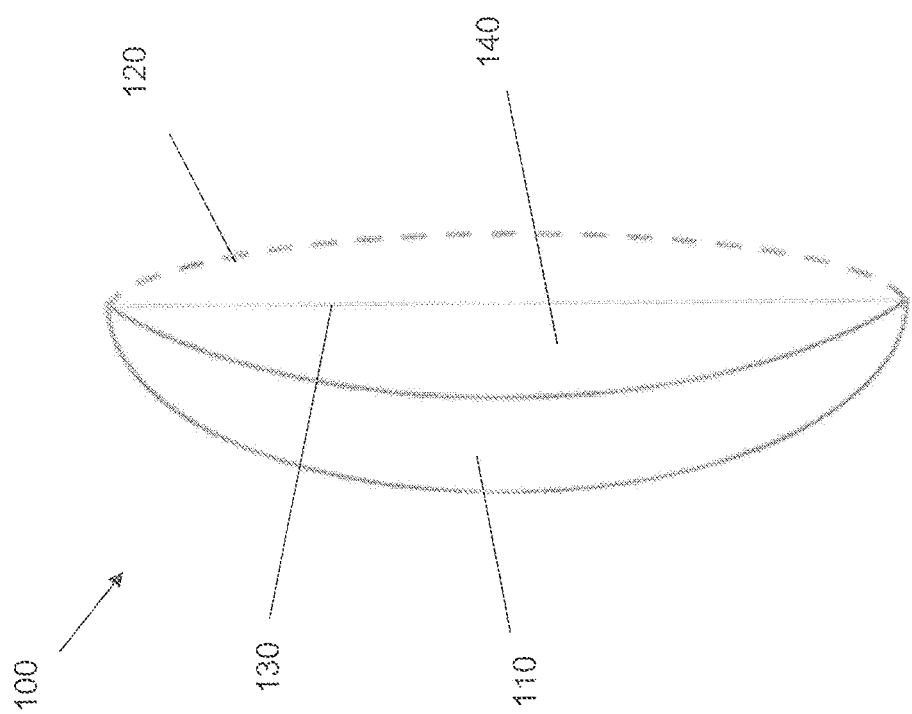
FIG. 1 shows a side perspective view of a portion of a lens according to a first embodiment of the invention.

Embodiments of the present invention will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

It is noted that references in the specification to "one embodiment," "an embodiment," "an example embodiment," etc., indicate that the embodiment described can include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

The use of fluid lenses according to embodiments of the present invention to provide vision correction has important advantages over conventional means of vision correction, such as rigid lenses and contact lenses. First, fluid lenses are easily adjustable. Thus a presbyope who requires an additional positive power correction to view near objects can be fitted with a fluid lens of base power matching the distance prescription. The user can then adjust the fluid lens to obtain additional positive power correction as needed to view objects at intermediate and other distances.

Second, fluid lenses can be adjusted continuously over a desired power range by the wearer. As a result, the wearer can adjust the power to precisely match the refractive error for a particular object distance in a particular light environment. Thus, fluid lenses allow adjustment of power to compensate for alteration of the natural depth of focus of the eye that depends on the wearer's pupil size, which is in turn dependent on the ambient light level. For example, many patients report a condition called "night myopia" wherein a patient becomes myopic at low ambient light levels, for example when outdoors at night. This condition is caused by enlargement or dilation of the pupil at low light levels, which causes a reduction of the spherical equivalent power of the focusing apparatus of the eye which includes the cornea, the natural crystalline lens, and the pupil. In accordance with an embodiment of the present invention, a patient with night myopia can adjust the fluid lens to compensate for night myopia.

Third, although 20/20 vision, which corresponds to an image resolution of 1 minute of arc (1/60 degree) is generally acknowledged to represent an acceptable quality of vision, the human retina is capable of finer image resolution. It is known that a healthy human retina is capable of resolving 20 seconds of arc (1/300 degree). Corrective eyeglasses designed to enable a patient to achieve this superior level of vision have a resolution of about 0.10D or better. This resolution can be achieved with continuously adjustable fluid lens elements, such as embodiments of the fluid lens described herein.

According to an embodiment of the present invention, the term fluid lens assembly includes a fluid lens, a connecting tube, and a reservoir containing excess fluid, all connected to form a single sealed cavity. The term fluid lens element refers to the fluid lens alone, which includes a rigid lens, a flexible membrane, and a layer of fluid therebetween.

One or more actuation systems (not shown) are housed in an eyeglass frame (not shown) for adjusting the power of the fluid lens. An eyeglass assembly can include an eyeglass frame configured to accept one or more fluid lenses. The frame can be of any shape, and can be made of plastic, metal, or any other suitable material. The frame can also simply be a piece of wire or tube wound around or otherwise connected to the lenses.

In an embodiment of an eyeglass assembly including one or more fluid lenses, each fluid lens may be provided with its own actuation system, so that the lens for each eye can be adjusted independently. This feature allows users, such as anisometropic patients, to correct the refractive error in each eye separately, in order to achieve appropriate correction in both eyes, which can result in better binocular vision and binocular summation.

The actuation system may be mounted on or inside the temple pieces of the eyeglass assembly, so that it is made as inconspicuous as possible, while maintaining ease of operation. Each fluid lens may be provided with an opening that is connected to a tube attached at the other end to a reservoir of excess fluid. The tube connecting the reservoir to the fluid lens may be threaded through the frame hinge. The reservoir may be housed inside a slot running along the length of the temples, and may be folded back on itself to squeeze additional fluid into the fluid lens assembly through the connecting tube. Similarly, the reservoir may be unfolded to draw fluid into it from the fluid lens assembly in order to reduce the positive power of the fluid lens.

In an embodiment, the fluid lens, the connecting tube and the reservoir together form a sealed unit. Provision is made to squeeze the reservoir to push fluid out into the fluid lens through the connecting tube. For example, the provision to squeeze the reservoir can be in the form of a plunger impinging against a diaphragm to increase pressure within the reservoir, a caliper for squeezing the reservoir, or any other fluid pump or actuator known to one of skill in the art. An exemplary activation system including an exemplary sealed unit is disclosed, for example, in U.S. Pat. No. 8,087,778, which is incorporated by reference herein in its entirety.

Because the power of the fluid lens element is controlled by the expansion of the flexible membrane in response to fluid being pumped in or out of the fluid lens element, it is theoretically capable of providing a continuous range of spherical power corrections within the limits of design of that particular fluid lens element. In practice, different patients will achieve different limits of adjustability when provided the same fluid lens element. Typically, clinical studies show that this limit of perception of differing image blur ranges from approximately 0.05D to 0.15D.

FIG. 1 shows a side perspective view of a portion of fluid lens assembly 100 according to an embodiment of the invention. The lens of this embodiment may be designed to cover a positive power range, e.g., +10D to +2D.

Fluid lens assembly 100 includes at least one rigid lens body 110, a flexible membrane 120 attached to lens body 110 at edge 130 so as to form a seal preventing fluid from entering or leaving the cavity formed between rigid lens body 110 and membrane 120, and a layer of fluid 140 filling the space between membrane 120 and rigid lens body 110.

Rigid lens body 110 can be made of, for example, polycarbonate of bisphenol A having a refractive index of, for example, approximately 1.59. Alternative embodiments can include rigid lens body 110 made of a different material, which may alter its refractive index. For example, if an aromatic polyurethane of refractive index 1.667 is used to fabricate the rigid lens, then the positive power range can be achieved with a flatter curvature of the front lens, which some users consider cosmetically superior. Other materials that may be used to fabricate the rigid lens are, for example and without limitation, Diethylglycol bisallyl carbonate (DEG-BAC), poly(methyl methacrylate), PMMA and a proprietary polyurea complex, trade name Trivex (PPG).

Rigid lenses are generally cast or molded from a polymer using a pair of molds. The curvature of the surface of the molds may match the specification of a toric curve that is required for a particular stock keeping unit (SKU). The ability to provide a considerable range of adjustment in power confers an important advantage to fluid lens assemblies relative to conventional ophthalmic lenses in terms of cost and number of SKUs. For example, the negative power range of approximately −0.25D to approximately −7.25D can be covered by three SKUs for correction of spherical errors only, and 51 SKUs for correction of both spherical and astigmatic errors in the range of approximately 0.0D to approximately −4.00D.

In an embodiment, the optic of the rigid lens of these embodiments, especially the surface in contact with air, can be aspherized to correct for spherical aberration for off-axis incidence and also to reduce lens thickness.

In an embodiment, flexible membrane 120 is made of a cross-linked polymer or a polymer that can be stretched to assume a spheroidal shape when inflated, but will revert back to its original shape when uninflated. Membrane 120 can have different thicknesses at different points, and can have different moduli of mechanical stress at different directions, or different moduli of mechanical stress at different points. Alternative embodiments of membrane 120 may include any combination of the above features.

When a non-round liquid lens is inflated, the curvature of the inflated surface varies with orientation and may develop astigmatism. In an embodiment, this induced astigmatic error is minimized by altering the stiffness of the membrane as a function of direction of the applied mechanical or hydrostatic stress or by altering its location relative to the geometrical center of the liquid lens. Thickness profiles for membrane 120 can be developed by, for example, injection molding or blow molding the membrane. The orientation dependence of the elastic modulus of membrane 120 can be provided by, for example, biaxially stressing the membrane at an elevated temperature and then freezing in the strain. In an embodiment, strain ratios of 2.0:1 to 3.0:1 are allowed.

The tensile modulus of membrane 120 can also be modulated from point to point by applying a rigid, high modulus coating to membrane 120 and varying the thickness of the coating from point to point as specified in the form of a sag table, for example. Such a coating may be a ceramic such as, for example, SiOx or SixNy. Additionally or alternatively, other vapor deposited ceramic coatings such as alumina (Al2O3 or TiO2) may be used. The contoured coating may be applied, for example, by using a mask when applying the coating by chemical or physical vapor deposition, or by varying the time of exposure of the surface to the coating in vapor form by using a preprogrammed shadowing device that moves along a specified trajectory at a given speed.

In an embodiment, membrane 120 provides a reliable and durable barrier to diffusion of the fluid inside the cavity and is puncture resistant for consumer ophthalmic applications. In an embodiment, membrane 120 is made of oriented or partially crystalline polymers that have high glass transition temperatures, such as 100° C. or higher, (e.g. 130° C. or higher), high melting points, although they may have a relatively low glass transition temperature, e.g., polyvinyl fluoride (TEDLAR, commercialized by Du Pont Corp. of Wilmington, Del.) and a high elongation to break, such as 120% or higher, which will provide adequate toughness and puncture resistance. Glass transition and melting points of polymers used for membranes are given in Table 1. If a partially crystalline polymer such as PEEK (polyether ether ketone) or fluoropolymers such as TEDLAR, Polyvinyledene difluoride (PVDF), or PTFE are used for membrane 120, the melting point may be 150° C. or higher. Polyolefins such as poly(norbornene) may be used as membrane materials. Other polymers suitable for use as membrane materials include, for example and without limitation, polysulfones, polyurethanes, polythiourethanes, polyethylene terephthalate, polymers of cycloolefins and aliphatic or alicyclic polyethers.

TABLE 1

| Polymer | Glass transition temperature | Melting point |
| --- | --- | --- |
| Polyvinyl fluoride (TEDLAR ™) | 41° C. | 200° C. |
| Polyvinyledene difluoride (PVDF) | −40° C. | 175° C. |
| Polytetrafluoroethylene (PTFE) | 127° C. | 327° C. |
| Polyethylene-tetrafluoroethylene (ETFE) | 147° C. | 265° C. |
| Poly-ether ether ketone (PEEK) | 145° C. | 395° C. |

FIG. 2 is a table that shows optical characteristics for various lens assemblies that cover a positive power range according to various embodiments of the invention, such as for example, the lens assembly of FIG. 1. The values were calculated for a lens assembly having rigid lens body 110 made of polycarbonate of bisphenol A having a refractive index of 1.59. The lens assembly used to calculate the values of table 2 further included fluid 140 made of silicone (polysiloxane) having a refractive index of 1.50. One of skill in the art will recognize that other lens and fluid materials may be used according to embodiments described herein to provide different ranges of adjustability and/or rigid lens powers.

Row 1 of the table of FIG. 2 provides optical characteristics for an embodiment of fluid lens assembly 100 of the present invention. This embodiment includes rigid lens body 110 having a radius of curvature of approximately 295 mm. The power of rigid lens body 110 is approximately 3.0D, and the front curve of rigid lens body 110 has a radius of curvature of approximately 116 mm.

The power of this embodiment of fluid lens assembly 100 is least positive when membrane 120 is flat. The optical power of the fluid lens of this embodiment is approximately 1.7D. As a result, when membrane 120 is flat, the overall optical power of this embodiment of fluid lens assembly 100 is approximately 4.7D.

The overall optical power of fluid lens assembly 100 can therefore be increased by injecting additional fluid into the cavity that will lead to an increase in fluid pressure and cause membrane 120 to expand. In one embodiment, after inflation, the curvature of the membrane is approximately 125 mm. As a result, the power of this embodiment of the fluid lens assembly when inflated is approximately 7.7D. Accordingly, after inflation, the power of the fluid lens element was increased by approximately 3.0D.

Figure 3:
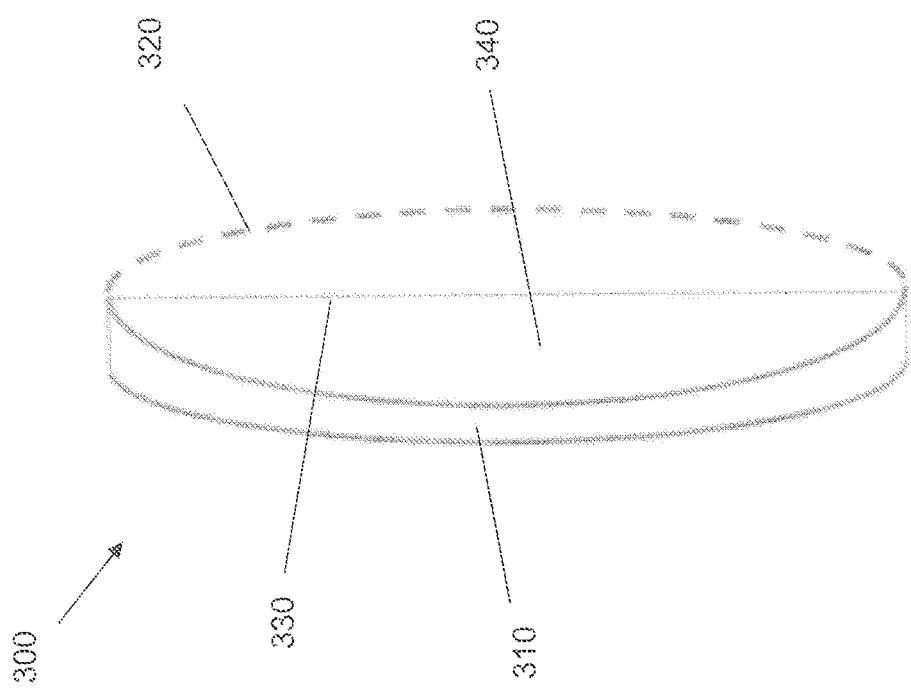
FIG. 3 shows a side perspective view of a portion of a lens according to an embodiment of the invention.

FIG. 3 shows a side perspective view of a portion of a lens according to another embodiment of the invention. The lens of this embodiment may be designed to cover lower positive powers as well as zero power and low negative powers, e.g., from +1.75D to −1.00D.

In an embodiment, fluid lens assembly 300 includes at least one rigid lens body 310, a flexible membrane 320 attached to lens body 310 at edge 330 so as to form a seal preventing fluid from entering or leaving the cavity formed between rigid lens body 310 and membrane 320, and a layer of fluid 340 filling the space between membrane 320 and rigid lens body 310.

Figure 4:
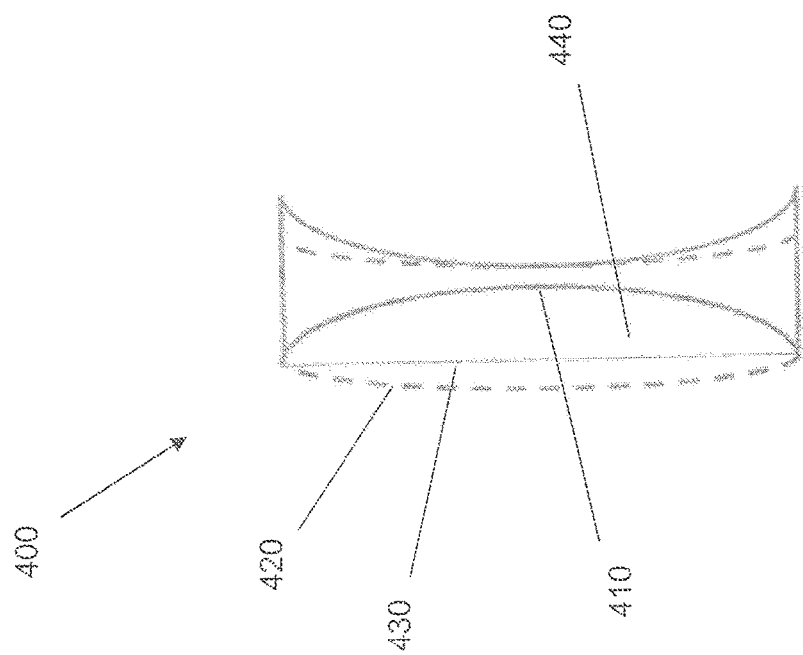
FIG. 4 shows a side perspective view of a portion of a lens according to an embodiment of the invention.

FIG. 4 shows a side perspective view of a portion of a lens according to another embodiment of the invention. This embodiment may be designed to cover a negative power range, e.g., −10D to −2D.

In an embodiment, fluid lens assembly 400 includes at least one rigid lens body 410, a flexible membrane 420 attached to lens body 410 at edge 430 so as to form a seal preventing fluid from entering or leaving the cavity formed between rigid lens body 410 and membrane 420, and a layer of fluid 440 filling the space between membrane 420 and rigid lens body 410.

Rigid lens body 410 is a negative rigid lens having a concave inner surface in order to achieve a low overall power. In an embodiment, flexible membrane 420 is adapted to be disposed in front of rigid lens body 410, such that flexible membrane 420 is located farther away from a user's eye when worn. In one embodiment, for example, the front curve of the rigid lens is approximately 3.00D, the power of the rigid lens is approximately −1.00D, and the radius of curvature of the back surface is approximately 147.5 mm. As a result, the power of the fluid lens at its lowest power is approximately 3.39D, and the power of the overall assembly is 2.39D. Accordingly, the range of adjustability for this embodiment is approximately 2.39D to approximately 5.39D.

In an embodiment, fluid lens assembly 400 is adapted to achieve an overall negative optical power. In this embodiment, rigid lens body 410 is a negative rigid lens having a concave inner surface. Flexible membrane 420 is attached to lens body 410 at edge 430 so as to form a seal preventing fluid from entering or leaving the cavity formed between rigid lens body 410 and membrane 420, and a layer of fluid 440 filling the space between membrane 420 and rigid lens body 410. In this embodiment, fluid lens assembly 400 is configured so that when membrane 420 expands, the power of the fluid lens, which includes membrane 420 and fluid 440, is more positive than the negative power of rigid lens body 410. If the rigid lens is sufficiently negative by itself, fluid lens assembly 400 achieves an overall negative optical power even when the flexible membrane is expanded.

FIG. 5 is a table that shows optical characteristics for various lens assemblies that cover negative and negative-to-positive power ranges according to various embodiments of the invention. The values were calculated for a lens assembly having rigid lens body 410 made of polycarbonate of bisphenol A having a refractive index of 1.59. The lens assembly used to calculate the values of table 5 further included fluid 440 made of silicone (polysiloxane) having a refractive index of 1.50. One of skill in the art will recognize that different values may be obtained when different materials are used.

The optical power of embodiments of the fluid lens assemblies disclosed herein involve five parameters: (1) the power of the rigid lens, (2) the curvature of the surface of the rigid lens in contact with the fluid, (3) the curvature of the membrane, (4) the refractive index of the fluid, and (5) the thickness of the fluid layer. The lens system can accordingly be analyzed as one having three surfaces, two refractive indices (material of the rigid lens and fluid), and two thicknesses. Because the power of embodiments of the fluid lens assembly can only be altered in the positive direction, the power of the rigid lens itself is the minimum possible power value to which the fluid lens assembly can be adjusted.

To cover a range of positive powers, a range of positive powers for the rigid lens is selected. The radii of curvature of the front surface (also called the front curve or base curve) of the rigid lens is also selected. This selection process may include consideration of image quality for each configuration, as well as cosmetic factors such as facial wrap. The front surface for a given lens may be designed based on the refractive index of the material.

In an embodiment, for purposes of these calculations, the power of the fluid lens assembly can be simplified as a function of the power of the rigid lens, the power of the fluid lens element and the radius of curvature of the surface of the rigid lens in contact with the fluid. The refractive index of the membrane does not need to be taken into account because in this configuration, the membrane is very thin and can be modeled as remaining uniform in thickness over the full range of inflation. Nevertheless, the refractive index of the membrane is an important design parameter because it may be matched to the refractive index of the fluid in the fluid lens.

The foregoing examples demonstrate methods to cover the spherical range of vision correction required for a typical population. The rigid lens can also be provided with toric correction to correct for astigmatic error. In an embodiment, this correction is placed on the surface of the rigid lens that is in contact with air. Typical astigmatic error in a population ranges from about −0.25D to about −4.00D, in steps of 0.25D in order to cover 95% of the population.

Although various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A fluid lens assembly, comprising:
   a front rigid lens;
   a semi-flexible membrane that is adapted to be expanded from a minimum inflation level to a maximum inflation level,
      wherein the semi-flexible membrane comprises a material selected from a group consisting of: oriented crystalline polymer, partially crystalline polymer having a glass transition temperature or a melting point of at least 100 degrees Celsius, polyvinyl fluoride, polyether ether ketone, fluoropolymer, polyolefin, polysulfone, polyurethane, polythiourethane, polyethylene terephthalate, a polymer of cycloolefin, aliphatic polyether, and alicyclic polyether,
      wherein the semi-flexible membrane with uniform thickness is directly attached to the front rigid lens at edge to form a sealed cavity, wherein the membrane is configured to be stretched when inflated and to revert back to its original shape when uninflated, and
      wherein the semi-flexible membrane is configured to remain uniform in thickness during inflation; and
   a fluid layer located in the sealed cavity between the front rigid lens and the semi-flexible membrane,
   wherein the front rigid lens is configured to have a negative optical power.

2. The fluid lens assembly of claim 1 wherein said front lens is further configured to have a biconcave geometry.

3. The fluid lens assembly of claim 1, wherein the fluid lens assembly is configured to have an overall negative optical power when the membrane is expanded to the maximum inflation level.

4. The fluid lens assembly of claim 1, wherein the fluid lens assembly is configured to have an overall negative optical power when the membrane is expanded between the minimum inflation level and the maximum inflation level.

5. The fluid lens assembly of claim 1, wherein, the fluid lens assembly is configured to have an overall positive optical power when the membrane is expanded to the maximum inflation level.

6. The fluid lens assembly of claim 1, wherein the fluid lens assembly is configured to have an overall positive optical power when the membrane is partially expanded between the minimum inflation level and the maximum inflation level.

7. The fluid lens assembly of claim 1, wherein the fluid lens assembly is configured to have a 3 diopter range of optical power between the minimum inflation level and the maximum inflation level.

8. The fluid lens assembly of claim 1, wherein the fluid lens assembly is configured to have a non-round shape.

9. The fluid lens assembly of claim 8, wherein the surface of the front lens not adjacent to the fluid layer is concave.

10. The corrective eyepiece of claim 9, wherein one or more of the fluid lens assemblies is configured to have an overall negative optical power when the membrane is expanded to the maximum inflation level.

11. The corrective eyepiece of claim 9, wherein one or more of the fluid lens assemblies is configured to have an overall negative optical power when the membrane is expanded between the minimum inflation level and the maximum inflation level.

12. The corrective eyepiece of claim 9, wherein one or more of the fluid lens assemblies is configured to have an overall positive optical power when the membrane is expanded to the maximum inflation level.

13. The corrective eyepiece of claim 9, wherein one or more of the fluid lens assemblies is configured to have an overall positive optical power when the membrane is partially expanded between the minimum inflation level and the maximum inflation level.

14. The corrective eyepiece of claim 9, wherein one or more of the fluid lens assemblies is configured to have a 3 diopter range of optical power between the minimum inflation level and the maximum inflation level.

15. The corrective eyepiece of claim 9, wherein one or more of the fluid lens assemblies is configured to have a non-round shape.

16. The corrective eyepiece of claim 15, wherein one or more of the fluid lenses includes a concave surface adjacent to the fluid layer.

17. The corrective eyepiece of claim 9, wherein one or more of the fluid lenses includes a concave surface adjacent to the fluid layer.

18. The fluid lens assembly of claim 1, wherein the surface of the front lens adjacent to the fluid layer is concave.

19. A corrective eyepiece comprising two fluid lens assemblies, each fluid lens assembly comprising:

a front rigid lens;

a semi-flexible membrane that is adapted to be inflated from a minimum inflation level to a maximum inflation level, wherein the semi-flexible membrane comprises a material selected from a group consisting of: oriented crystalline polymer, partially crystalline polymer having a glass transition temperature or a melting point of at least 100 degrees Celsius, polyvinyl fluoride, polyether ether ketone, fluoropolymer, polyolefin, polysulfone, polyurethane, polythiourethane, polyethylene terephthalate, a polymer of cycloolefin, aliphatic polyether, and alicyclic polyether, wherein the semi-flexible membrane with uniform thickness is directly attached to the front rigid lens at edge to form a sealed cavity, wherein the membrane is configured to be stretched when inflated and to revert back to its original shape when uninflated, and wherein the semi-flexible membrane is configured to remain uniform in thickness during inflation; and a fluid layer located in the sealed cavity between the front rigid lens and the semi-flexible membrane, wherein the front rigid lens is configured to have a negative optical power.

* * * * *